US011005773B2

(12) United States Patent
Parker et al.

(10) Patent No.: US 11,005,773 B2
(45) Date of Patent: May 11, 2021

(54) DATA DRIVEN AUTOMATED PROVISIONING OF TELECOMMUNICATION APPLICATIONS

(71) Applicant: Microsoft Technology Licensing, LLC, Redmond, WA (US)

(72) Inventors: Ronald M. Parker, Boxborough, MA (US); Prasad Jonnalagadda, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 684 days.

(21) Appl. No.: 15/374,172

(22) Filed: Dec. 9, 2016

(65) Prior Publication Data

US 2017/0171102 A1 Jun. 15, 2017

Related U.S. Application Data

(60) Provisional application No. 62/265,633, filed on Dec. 10, 2015.

(51) Int. Cl.
*H04L 12/46* (2006.01)
*H04L 29/06* (2006.01)
(Continued)

(52) U.S. Cl.
CPC .......... *H04L 47/70* (2013.01); *H04L 12/4641* (2013.01); *H04L 67/02* (2013.01);
(Continued)

(58) Field of Classification Search
CPC ....................................................... H04L 47/70
See application file for complete search history.

(56) References Cited

U.S. PATENT DOCUMENTS

| 4,872,157 A | 10/1989 | Hemmady et al. |
| 4,872,159 A | 10/1989 | Hemmady et al. |
| (Continued) | | |

FOREIGN PATENT DOCUMENTS

| CN | 101188520 A | 5/2008 |
| CN | 102118294 A | 7/2011 |
| (Continued) | | |

OTHER PUBLICATIONS

International Search Report and Written Opinion issued by the U.S. Patent and Trademark Office as International Searching Authority for International Application No. PCT/US16/65836, dated Mar. 2, 2017 (10 pages).

(Continued)

*Primary Examiner* — Ario Etienne
*Assistant Examiner* — Sm Z Islam
(74) *Attorney, Agent, or Firm* — Ray Quinney & Nebeker, P.C.; Thomas M. Hardman; Sunah K. Lee

(57) ABSTRACT

Systems and methods for building service templates that allow for an agentless, data-driven and stateful automation of a provisioning of services to mobile network customers. Data associated with a request to create a target schema object class for a device and protocol are received. Based on the device and protocol information, a set of data fields associated with CRUD semantics is retrieved from either a database or from user provided data. A decorated target object class is created based on the requested target schema object class. A subrecipe is created including the decorated target object class, and one or more other decorated target object classes. A recipe is processed for transmission to an execution engine to form a service instance, the service instance being customizable by an operator for a specific network device such that the service instance data fields that are not pre-filled can be customized by the operator.

20 Claims, 12 Drawing Sheets

(51) Int. Cl.
*H04L 12/911* (2013.01)
*H04L 29/08* (2006.01)

(52) U.S. Cl.
CPC .............. *H04L 67/16* (2013.01); *H04L 67/34* (2013.01); *H04L 67/42* (2013.01)

(56) References Cited

U.S. PATENT DOCUMENTS

| | | | |
|---|---|---|---|
| 4,872,160 A | 10/1989 | Hemmady et al. | |
| 4,875,206 A | 10/1989 | Nichols et al. | |
| 4,894,824 A | 1/1990 | Hemmady et al. | |
| 4,896,319 A | 1/1990 | Lidinsky et al. | |
| 4,897,874 A | 1/1990 | Lidinsky et al. | |
| 4,899,333 A | 2/1990 | Roediger | |
| 4,922,486 A | 5/1990 | Lidinsky et al. | |
| 4,942,574 A | 7/1990 | Zelle | |
| 4,958,341 A | 9/1990 | Hemmady et al. | |
| 4,977,582 A | 12/1990 | Nichols et al. | |
| 7,293,080 B1* | 11/2007 | Clemm ................... H04L 12/00 370/254 |
| 7,483,995 B2 | 1/2009 | Abhishek et al. | |
| 7,596,369 B2 | 9/2009 | Alperin et al. | |
| 8,085,808 B2 | 12/2011 | Brusca et al. | |
| 8,102,813 B2 | 1/2012 | Abhishek et al. | |
| 8,364,633 B2 | 1/2013 | Aahlad et al. | |
| 8,489,834 B1* | 7/2013 | Kumbhari ........... H04L 67/1097 711/162 |
| 8,515,488 B2 | 8/2013 | Hillier et al. | |
| 8,799,512 B2 | 8/2014 | Alperin et al. | |
| 9,128,472 B2 | 9/2015 | Lawson et al. | |
| 2003/0208609 A1 | 11/2003 | Brusca | |
| 2004/0015963 A1* | 1/2004 | Huber ...................... G06F 8/71 717/178 |
| 2004/0181538 A1* | 9/2004 | Lo .......................... G06F 16/288 |
| 2006/0050862 A1* | 3/2006 | Shen ................... H04L 12/2856 379/219 |
| 2006/0092861 A1* | 5/2006 | Corday ............... H04L 41/0213 370/256 |
| 2006/0183469 A1 | 8/2006 | Gadson | |
| 2008/0140726 A1 | 6/2008 | Aahlad et al. | |
| 2009/0116381 A1 | 5/2009 | Kanda | |
| 2009/0276771 A1* | 11/2009 | Nickolov ............ H04L 67/1014 717/177 |
| 2011/0029658 A1 | 2/2011 | Werth et al. | |
| 2011/0047612 A1 | 2/2011 | D'ambrosio et al. | |
| 2012/0143923 A1* | 6/2012 | Whitney ............... G06F 16/907 707/803 |
| 2012/0309383 A1 | 12/2012 | Van Phan et al. | |
| 2012/0323703 A1 | 12/2012 | Hillier | |
| 2014/0164163 A1* | 6/2014 | Bernard ................ G06F 17/243 705/26.3 |
| 2014/0188971 A1 | 7/2014 | Aahlad et al. | |
| 2014/0189004 A1 | 7/2014 | Aahlad et al. | |
| 2014/0241174 A1* | 8/2014 | Harris ................. H04L 43/0888 370/252 |
| 2014/0324501 A1* | 10/2014 | Davidow .......... G06Q 10/06311 705/7.17 |
| 2015/0169515 A1* | 6/2015 | Hagen .................. G06F 40/186 707/756 |
| 2015/0286969 A1 | 10/2015 | Warner et al. | |

FOREIGN PATENT DOCUMENTS

| | | |
|---|---|---|
| CN | 102567080 A | 7/2012 |
| CN | 103346924 A | 10/2013 |
| CN | 103986665 A | 8/2014 |
| CN | 103648088 B | 10/2016 |
| WO | WO-2007062573 A1 | 6/2007 |
| WO | WO-2014124558 A1 | 8/2014 |

OTHER PUBLICATIONS

Extended European Search Report issued in EP16873918.3, dated Jun. 21, 2019 (6 pages).

\* cited by examiner

DATA DRIVEN AUTOMATED PROVISIONING OF TELECOMMUNICATION APPLICATIONS

CROSS REFERENCE TO RELATED APPLICATIONS

The present application claims priority to U.S. Provisional Application No. 62/265,633, filed Dec. 10, 2015, entitled "Data Driven Automated Provisioning of Telecommunication Applications," which is incorporated herein by reference.

TECHNICAL FIELD

The present disclosure relates to data automation. More specifically, the present disclosure relates to systems and methods of providing data driven automated provisioning of telecommunication applications.

BACKGROUND

Telecommunication (Telco) network functions and applications (also referred to herein as applications or telco applications) tend to have very rich and complex configuration models. Telco applications also tend to be long-lived and frequently reconfigured. For example, in a network that supports consumer mobility customers, a number of network nodes and back-end business systems require configuration each time an additional consumer joins the network.

Traditionally, the ultimate integration point for these frequent configuration options in a telco environment is the Operation Support System/Business Support System (OSS/BSS) system. However, integration of new devices and/or services into the network tend to be very time consuming and very expensive, requiring custom code development in the OSS/BSS system—itself a very large, complex, and customized system. Additionally, the end result, even after expenditure of sufficient time and money, is that the procedure is not highly automated, instead leading a user through a sequential set of GUI screens, often one per type of device that requires configuration to support the overall service.

SUMMARY

Systems and methods are disclosed herein for building service templates that allow for an agentless, data-driven and stateful automation of a provisioning of services to mobile network customers. In some embodiments, a computing device receives data associated with a request to create a connected device type category, the connected device type category associated with a device and associated protocol in a mobile network. In some embodiments, a computing device receives data associated with a request to create a target schema object class associated with the connected device type category, the request including a first object parameter associated with the target schema object class, the first object parameter including at least one of a device type of the device and the protocol, the target schema object class representing a class of configurable resources based on the device type and the protocol. In some embodiments, the computing device retrieves based on the first object parameter, a set of data fields associated with specifying create, read, update and delete (CRUD) semantics representing capabilities of the device from a database associated with the computing device, when configuration parameters associated with the protocol comprise an importable form, the importable form being associated with data that is importable from a server into the database, and user provided data when the configuration parameters associated with the protocol comprise a non-importable form, the non-importable form being associated with data that is not importable from a server into the database. In some embodiments, the computing device creates the requested target schema object class, the requested target schema object class including the retrieved set of data fields. In some embodiments, the computing device creates a decorated target object class based on the requested target schema object class, the decorated target object class including specified values for at least a portion of the data fields in the retrieved set of data fields. In some embodiments, the computing device receives data associated with a request to create at least one subrecipe, each of the at least one subrecipes comprising at least one of the decorated target object class, and one or more other decorated target object classes, and data indicating an association between the decorated target object class and the one or more other decorated target object classes. In some embodiments, the computing device processes a recipe for transmission to an execution engine to form a service instance, the recipe including the at least one subrecipe, the service instance comprising service instance data fields that are prefilled or hidden based on the specified values, the service instance being customizable by an operator for a specific network device such that the service instance data fields that are not pre-filled can be customized by the operator.

In some embodiments, a computing device determines a set of subrecipes in the at least one subrecipe having a common decorated target object class, wherein the common decorated target object class is present in each of the set of subrecipes. In some embodiments, a computing device receives a coalesced parameter for one common decorated target object class in one subrecipe in the set of subrecipes, wherein the coalesced parameter includes a set of values for data fields of the one common decorated target object class. In some embodiments, the computing device applies the coalesced parameter to each of the other common decorated target object classes associated with each of the other at least one subrecipes.

In some embodiments, the computing device creates a decorated target object class by receiving the specified values. In some embodiments, the specified values are derived from the first object parameter. In some embodiments, service instance further includes a target instance, the target instance including at least one of a virtual network function, physical network function or an application. In some embodiments, the configurable resources include at least one of quality of service, rating group, billing plan and packet filter. In some embodiments, the protocol includes at least one of representation state transfer (REST) protocol, structured query language (SQL) protocol, simple object access protocol (SOAP), secure files transfer protocol/secure shell protocol (SFTP/SSH), simple network management protocol (SNMP), and network and configuration protocol (NETCONF).

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
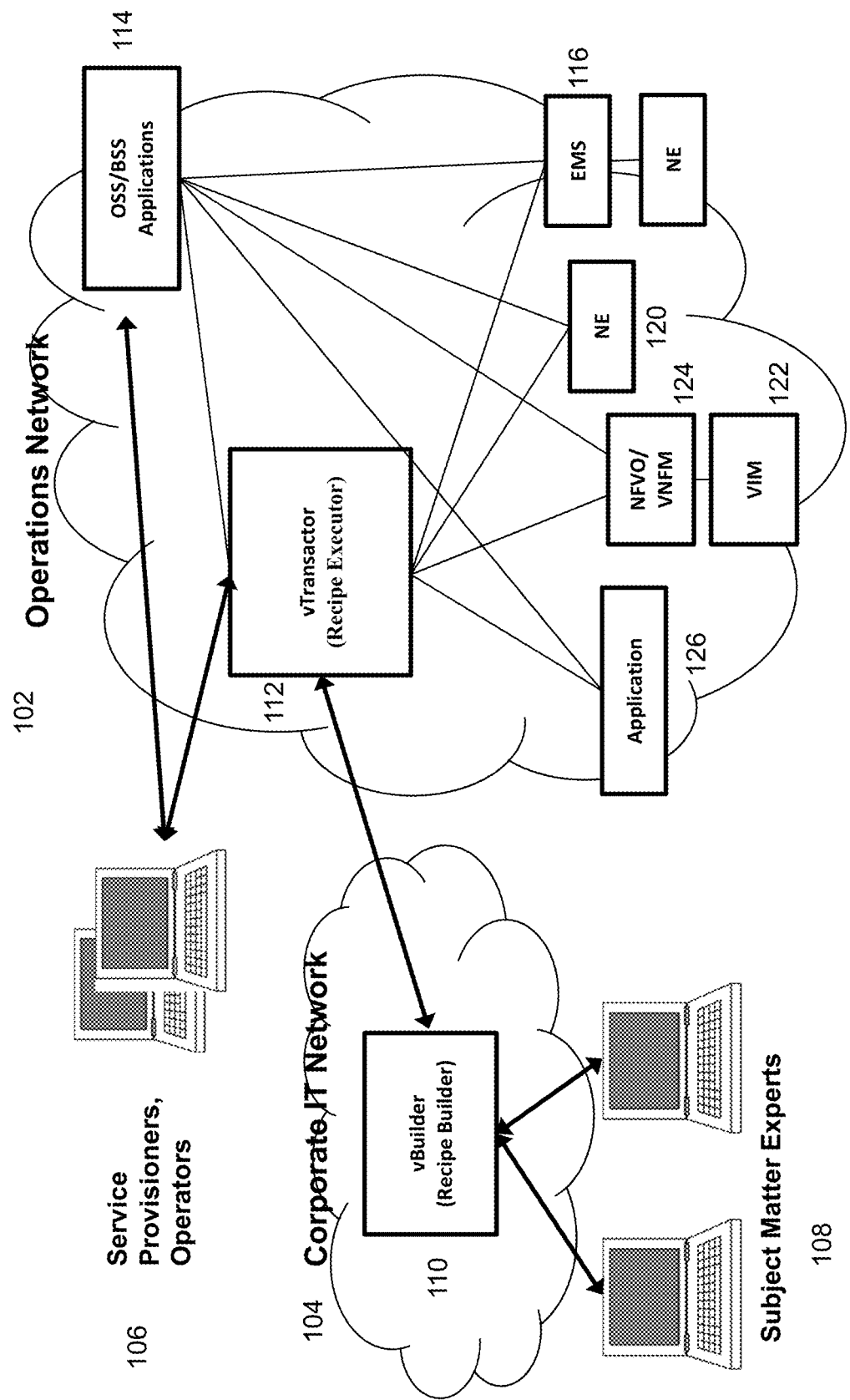
FIG. 1 is a system diagram showing a service automated platform deployment, according to some embodiments of the present disclosure.

In some embodiments, techniques are disclosed for automating telecommunication application configuration. The techniques disclosed herein allow for reusable recipes, subrecipes, and target schema object classes that can be customized for various telecommunication applications and devices.

For example, network function virtualization (NFV) is not just about turning up new virtual network functions (VNFs)/virtual machines (VMs). Many VNFs are long-lived and multi-tenant. Many VNFs have complex ongoing configuration needs.

For example, service function chaining (SFC) can increase integration challenges. VNFs in an SFC tend to be long-lived and multi-tenant. Coordination of policy is not completely solved by SFC (e.g., VNF may not know which policies are associated to a service function path (SFP) ID).

True end-to-end carrier services can require broad coordinated configuration, for example across a control plane (e.g., MME, RADIUS, PCRF, OCS, OFCS, PE routers) and various internal applications.

Service modeling can take too long (e.g., time it takes to define the service and how to realize it in the network) and are not automated enough (e.g., Metamodel Oriented Programming (MOPs) expressed as Word document with corresponding checklist).

Data driven approaches to automation have been utilized for quite some time in the form of scripts. At some level, the use of scripts to drive automation is data driven in that the script, itself, represents the data. Additionally, scripts are "fire and forget," resulting in no stateful representation of the effects achieved as a result of running the script.

While the scripting approach has been utilized in traditional information technology (IT) settings, for some time, it has not largely crossed over to the provisioning of telco applications. Unlike the typical telco application, the typical IT application is often configured at time of deployment with little or no need to incrementally reconfigure it. In contrast, telco applications require service configuration validation to ensure that the intended artifacts in the network are still provisioned as expected.

Attempts have been made to ease the integration of telco application configuration into automation frameworks, but each requires code writing by the developer of the automation platform, in the end, to accomplish the integration of the new devices, services, or procedures. In contrast, the approach described herein is entirely data driven and agentless where the end user of the solution provides all data necessary to model the required automation procedures.

Telco applications are also usually agentless. An agent-based approach allows clients (e.g., applications) to pull the required configuration from a server (e.g., an agent running on a server or virtual machine (VM) asking the server which software packages it should install). In contrast, without an agent, a central "manager" must push all required configuration at the various clients. Telco applications tend to be agentless because of the variety of vendors and types of applications (e.g., routers, DNS servers, PCRFs, PGWs, etc.). This is in contrast to a homogeneous environment with agent-based targets (e.g., installing an agent on Linux to for software installation and upgrade).

A data driven approach, as described herein, can refer to a user of the system that provides the information required to manage the configuration of any new network function or application. The system, as described in some embodiments, does not provide a list of supported network functions or applications. Instead, a user of the system can directly enable the configuration of said applications in a dynamic fashion. As described above, an agentless approach can be used in applications, such as telecommunications, where deploying a ubiquitous (e.g., deployed everywhere) agent to pull any and all types of configuration into any and all relevant network functions and applications is impracticable.

Also, to unburden the end-user from the problems described above, in some embodiments, a data automation language can be used to describe any and all automation procedures. In some embodiments, the systems and methods described herein use Extensible Markup Language (XML) to create a language that allows the expression of a generalized sequence of actions occurring over a supported transport such as Secure Shell/Command Line Interfaces (SSH/CLI) to some set of target entities. In some embodiments, this language is expressive enough to also capture if/else logic to handle any range of executable versions within the set of target entities.

Such an approach can be object oriented, allowing the life-cycle management of abstract service instances, which can include collections of supported native object instances on the targets that have been selected. Such service instances can be created, deleted, modified, checked for synchronization with the underlying targets, forced into synchronization on the underlying targets, checked for status, and harvested for statistics.

The approach described herein can support any required transport protocols towards the desired target devices, including Network Configuration Protocol (NETCONF), Simple Network Management Protocol (SNMP), SSH/CLI, SSH File Transfer Protocol (SFTP), Representational State Transfer (REST), and Simple Object Access Protocol (SOAP)/XML.

In some embodiments, services are defined using a recipe builder (also referred to herein as vBuilder). As described in more detail below, recipe builder allows subject matter experts (SMEs) to build recipes for network operators. In some embodiments, the system described herein provides a GUI-based end user device with no coding needed and no in-built product-specific adapters. In some embodiments, a reusable model definition by SME is used. As described in more detail below, one example of a reusable model definition is a subrecipe used in multiple recipes. In some embodiments, the system described herein allows for flexible argument handling and propagation and can be modified to support any target device or application over any transport connector (e.g., NETCONF, REST, SOAP, SNMP, Java Structured Query Language (JSQL), CLI/SSH). In some embodiments the system described herein supports multi-versioned targets.

In some embodiments, the system described herein provides service instantiation with a recipe transactor (also referred to herein as recipe vTransactor). Recipe transactor can import completed recipes from recipe builder. In some embodiments, services are triggered via GUI or programmatically (e.g., using REST). The services can include Create/Modify/Delete, Status, Statistics, and User-defined Actions. In some embodiments, the system described herein can track instantiated service instances, such as configuration synchronization/check, status with aggregation across targets, and statistics rollup across targets.

FIG. 1 is a system diagram showing a service automated platform deployment, according to some embodiments of the present disclosure. FIG. 1 shows operations network 102, corporate IT network 104, interface for operators 106, interface for subject matter experts (SMEs) 108, recipe builder (also referred to herein as recipe builder) 110, recipe executor (also referred to herein as recipe transactor) 112, Operation Support System/Business Support System (OSS/BSS) applications 114, element management system (EMS) 116, network element (NE) 118, NE 120, virtual I/O module (VIM) 122, NFV Orchestrator/virtual network function manager (NFVO/VNFM) 124, and application 126.

Recipe builder 110 can be deployed as a tool in a corporate network 104. In some embodiments, the target users are subject matter experts (SMEs) 108. SMEs 108 can communicate with recipe builder 110 through a web service architecture, such as REST. Recipe builder 110 specifies how to build models that are suited for repetitive invocations of a recipe. As described in more detail below, recipe builder 110, in some embodiments, allows SMEs 108 to specify how an operator can onboard a new customer by enabling the operator 106 to create, retrieve, update, and delete service instances. SMEs 108 are building in an object oriented program native target objects (also referred to herein as "target schema object classes" or "target schema objects")/decorated target objects (also referred to herein as "decorated target object classes") that make up a recipe (e.g., QoS policy, billing plan). Services can be defined by the recipe such that there is complete service modeling (e.g., Create/Modify/Delete, Status, Statistics, User-defined Actions). Coding and product-specific adapters are not needed in the system described herein at least in part because the recipe can be constructed by a SME 108 importing configuration object model schemas (e.g., router Vendor X's Yet Another Next Generation (YANG) modules) as well as a user's data entry via direct interaction with a recipe builder's GUI in order to define a "pseudo-schema" for applications that do not provide a machine readable schema. An example of this is an application or network function that is managed solely with a command line interface (CLI). The application provider may often publish a CLI user's guide in a PDF file (e.g., it is possible to publish a machine readable format such as a Backus-Noir-Form (BNF), but that provides only syntax and not semantics.). In the CLI document example, there is effectively no "official" schema for the application.

Recipe transactor 112, which resides in an operations network 102, allows an operator 106 to provision services based on a recipe received from recipe builder 110. Operators 106 can communicate with recipe transactor through a web service architecture, such as REST. Recipe transactor 112 utilizes the models in order to support life cycle management of service instances (e.g., create, retrieve, update, delete). Recipe transactor 112 can also talk to all other components (e.g., OSS/BSS applications 114, element management system (EMS) 116, network element (NE) 120, virtual I/O module (VIM) 122, NFV Orchestrator (NFVO)/virtual network function manager (VNFM) 124, and application 126) over a set of supported connectors or protocols. A model can be created from at least one of a priori knowledge of protocols or device related to service instantiation, and from protocol and device type detected by the recipe. An operator 106 can instantiate a service through recipe transactor 112 by providing to the recipe information particular to a specific target instance, as described in more detail below. Recipe transactor 112 can specify parameters to OSS/BSS applications 114, element management system (EMS) 116, network element (NE) 120, virtual I/O module (VIM) 122, NFV Orchestrator (NFVO)/virtual network function manager (VNFM) 124, and application 126 to instantiate a service. Recipe transactor 112 can also specify parameters to an OSS/BSS application 114 with further instructions to configure element management system (EMS) 116, network element (NE) 120, virtual infrastructure manager (VIM) 122, NFV Orchestrator (NFVO)/virtual network function manager (VNFM) 124, and application 126 to instantiate a service. Recipe transactor 116 can communicate with other operations network elements through a protocol/connector supported the system described herein (e.g., at least one of REST, SOAP, and NETCONF).

OSS/BSS applications 114 can be used to manage and support end-to-end telecommunications services. OSS includes management functions such as service provisioning. BSS include components that manage business operations for a telecommunications services provider. EMS 116 manages network elements 120 in a telecommunications network. NFVO/VNFM 124 manages and orchestrates NFV resources. VNFM manages VNF lifecycles. Application 126 refers to a telecommunications application.

As described above, recipe builder 110 is data driven. To automate the onboarding process, SME 108 can use combinations of one or more target schema objects (also referred to herein as "target schema object classes") and one or more decorated target objects (also referred to herein as "decorated target object classes") to limit the configuration parameters for each component that should be specified by an operator 106. As described in more detail below, a SME 108 can include combinations of target schema object classes in a single subrecipe as well as specify relationships between the target schema object classes. Recipe transactor 112 supports protocols that configures products, thereby lending itself to configuring the products themselves. A recipe can specify at least some of the parameters that are needed for each protocol. In some embodiments, a SME can simplify a model by hard-coding certain attributes that are otherwise flexible from the target's perspective and/or specify constraints that are more restrictive than the target's own constraints. In some embodiments, actual values that ultimately satisfy all constraints are processed by the transactor during execution of an operation (e.g., create, update, etc.).

For example, to onboard a customer, a SME 108 can compose a recipe that defines how to onboard the new customer. The recipe, composed by the SME 108, allows the operator to create, retrieve, update, and delete (also referred to herein as CRUD semantics) lifecycles for instantiation. One example of service instantiation is when a wireless carrier onboards a huge customer directly (e.g., AT&T® onboarding FedEx®) or when a wireless carrier onboards a subsidiary customer (e.g., AT&T® onboarding a mobile virtual network operator (MVNO)) such as Cricket Wireless). In some embodiments, onboarding a customer requires configuration of multiple touch points, as described in more detail below with FIG. 2.

Figure 2:
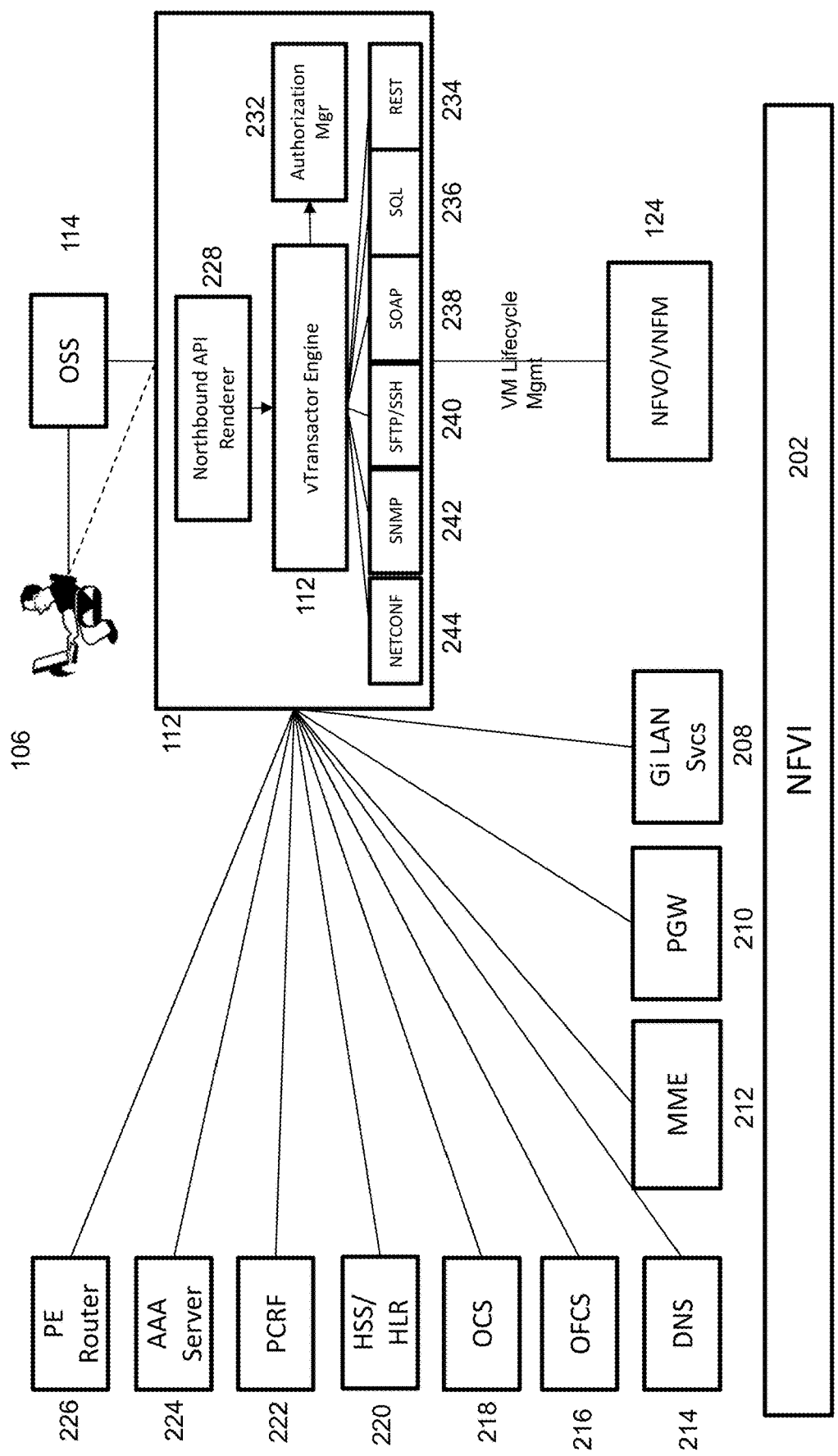
FIG. 2 is a system diagram showing automated onboarding of a new mobile virtual network operator (MVNO), according to some embodiments of the present disclosure.

FIG. 2 is a system diagram showing automated onboarding of a new MVNO, according to some embodiments of the present disclosure. FIG. 2 shows recipe transactor 112, network function virtualization infrastructure (NFVI) 202, OSS 114, NFVO/VNFM 124, Gi LAN Services 208, Packet Data Network Gateway (PGW) 210, Mobility Management Entity (MME) 212, Domain Name Server (DNS) 214, Offline Charging System (OFCS) 216, Online Charging System (OCS) 218, Home Subscriber Server/Home Location Register (HSS/HLR) 220, Policy and Charging Rules Function (PCRF) 222, Authentication, Authorization, and Accounting (AAA) server 224, Provider Edge (PE) Router 226, northbound application programming interface (API) renderer 228, recipe transactor Engine 112, authorization manager 232, representation state transfer (REST) protocol 234, structured query language (SQL) protocol 236, simple object access protocol (SOAP) 238, secure files transfer protocol/secure shell protocol (SFTP/SSH) 240, simple network management protocol (SNMP) 242, network and configuration protocol (NETCONF) 244.

NFVI 202 is a collection of compute, storage, and networking resources available for VNFs to utilize. In some embodiments, the system described herein can be used to manage virtual network functions, physical network functions or a combination of both virtual and physical network functions. As shown in FIG. 2, instantiating a service requires configuration of a diversity of network elements. For example, configuring PE router 226 can include configuring at least one of, or multiple instances of each of a border gateway protocol (BGP) virtual routing function (VRF) and multiprotocol label switching (MPLS) BGP/MPLS VRF; configuring AAA Server 224, PCRF 222, and HSS/HLR 220 can include configuring at least one of access point name (APN) policy mapping and international mobile subscriber identity (IMSI) policy mapping; configuring OCS 218 and OFCS 216 can include configuring APN to MVNO mapping; configuring DNS 214 can include configuring APN and PGW C-name records; configuring MME 212 can include configuring APN Operator Policy and PGW selection policy; and configuring Gi LAN Services 208 can include configuring PGW, APN, user equipment (UE) pools, BGP/MPLS VRF, workflow control, and data profile. Gi is the interface from GGSN/PGW to the Internet. In some embodiments, various value added services are inserted between the GGSN/PGW and the Internet. Those entities are referred to as GiLAN or Gi LAN. For example, a GiLAN service 208 can include configuration of policy and behavior for HyperText Transfer Protocol (HTTP) Proxy, Transmission Control Protocol (TCP) Proxy, HTTP Content Filtering, Network Address Translation (NAT), or firewall. As described above, operator 106 through a northbound API renderer 228, can execute recipes through recipe transactor 112 to configure network elements in order to create, retrieve, update, or delete a service instance through a supported protocol (e.g., REST 234, SQL 236, SOAP 238, SFTP/SSH 240, SNMP 242, NETCONF 244). In contrast, prior art techniques required either 1) manual programming for each new service instantiation; or 2) an inflexible system supporting only a few subset of services designed at high cost by an IT department or a scripting approach that retains inadequate state to validate previous configurations on an ongoing basis. As described in more detail below, the process of onboarding new customers is automated using the systems and methods described herein by information that a SME enters: 1) a first layer including a recipe, 2) a second layer including subrecipes, 3) a third layer including a) target schema object classes natively seen by the target (also referred to herein as a "target schema object"), and b) a target schema object class annotated by an SME (also referred to herein as a "decorated target object"). Verbs (e.g., CRUD) are a behavioral aspect of all layers.

In some embodiments, at the third layer, there is a 2-stage modeling approach—first import or define the target's native representation of a resource (e.g., object) and second to decorate or annotate that native representation to specify more restrictive constraints, perform data hiding via hard-coding of certain attributes, or simplification via coalescing (e.g., combining) multiple attributes. The aspect of the model that pertains to each of the CRUD verbs can be referred to as facets of the model—the recipe, subrecipe, target schema object class/decorated target object class—all have a create facet, update facet, etc., to represent the verb-specific aspects of the model. In some embodiments, one aspect of a resource or object model that is not verb-specific are the key attributes that uniquely identify an instance of the resource. Those attributes are fully specified to execute the verbs.

A target schema object, as described in some embodiments of the present disclosure, is a representation of the precision and flexibility afforded to the object by the native application—e.g., read the CLI guide to see that a static route object, for example, has a certain way of uniquely identifying instances of it, has certain mandatory attributes, certain optional attributes and that attributes have types and possibly constraints. Once the target schema object is established (e.g., imported by a SME), further refinement is allowed in the form of additional constraints, data hiding, and other operations such as coalescing attributes such that multiple attributes will always be provided identical values. For example, one can create a decorated target object class based on the static route target schema object class by restricting it to only use IP v4 addresses. In a different decorated target object class based on the same target schema object class, a restriction might be to only allow IP v6 addresses.

Authorization manager 232 enables some secondary functionality in some embodiments of the system described herein. A service instance that is created can be designated such that only a subset of operators may further act upon it (update, delete, etc.). For example, a Cricket MVNO and a Jasper MVNO can be created by a transactor, based on the MVNO model or recipe that is designed by SMEs. There can be one team of operators that may modify only the Cricket MVNO and a distinct team that may modify only the Jasper MVNO.

Figure 3:
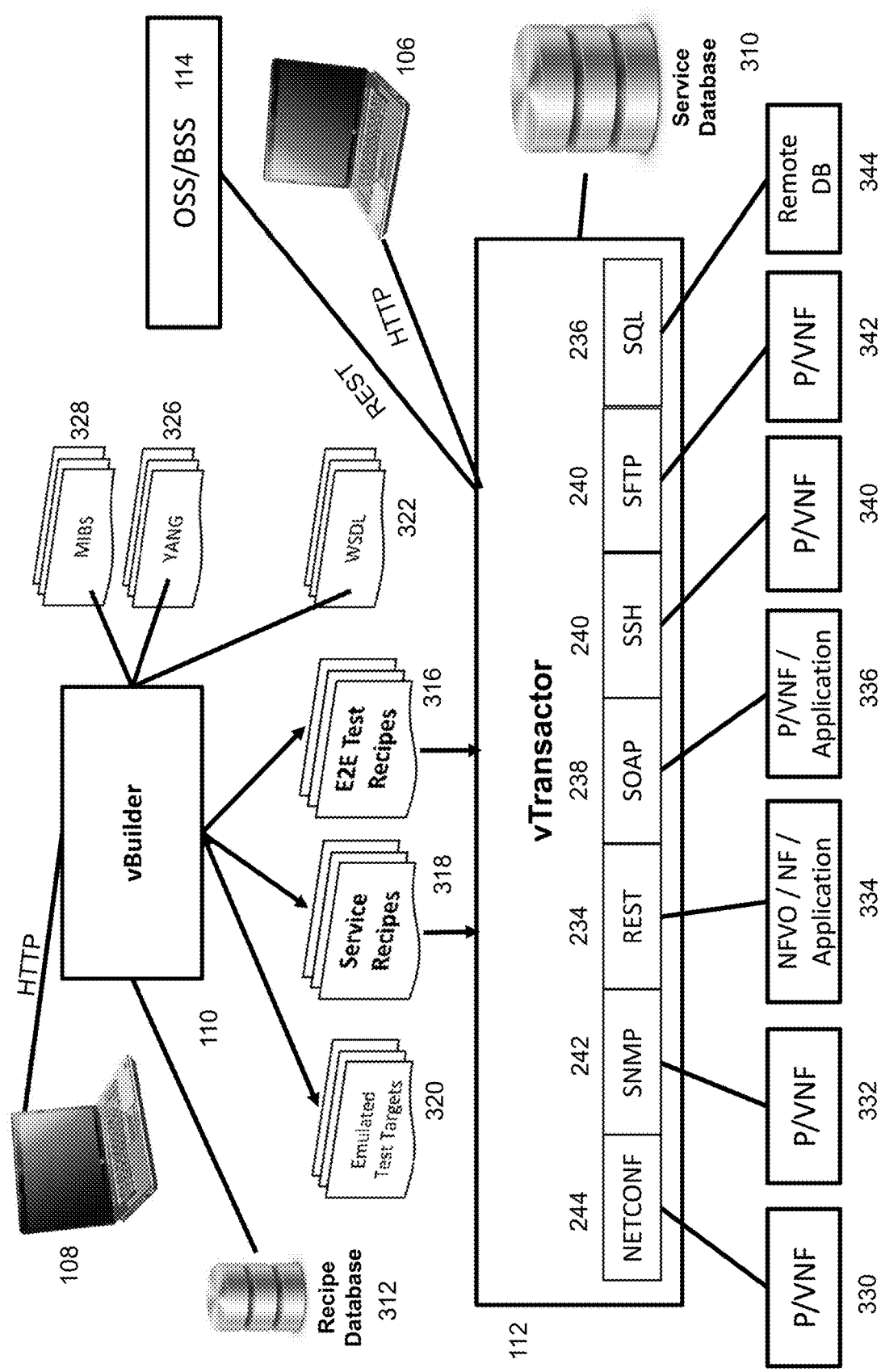
FIG. 3 is a system diagram of a recipe builder and a recipe transactor, according to some embodiments of the present disclosure.

FIG. 3 is a system diagram of recipe builder and recipe transactor, according to some embodiments of the present disclosure. FIG. 3 shows service database 310, recipe database 312, end to end (E2E) test recipes 316, service recipes 318, emulated test targets 320, Web Service Definition Language (WSDL) 322, XML Schema Definition (XSD) 324, Yet Another Next Generation configuration object modeling language (YANG) 326, Management Information Base (MIBS) 328, Physical/Virtual Network Function (P/VNF) 330 332 340 342, NFVO/NF/Application 334, P/VNF/Application 336, and remote database 344.

Service database 310 includes a record of service instantiated by recipe transactor 112. As described in more detail below, the record of service can include service instances, target types and target instances. Recipe database 312 includes a record of recipes, subrecipes, target schema objects, and decorated target object classes created by SME 108 through recipe builder 110.

Emulated test targets 320 allow SMEs to execute recipes in a simulated environment for testing, debugging and modification. Emulated test targets 320 refer to an emulation that can be defined by a SME of a target like a PCRF in terms of request/response pairs. This allows first level testing of subrecipes that are intended for PCRF, even before deployment on transactor.

Recipe builder 110 can create two types of recipes: E2E test recipes 316 and service recipes 318. E2E test recipes 316 can verify the behavior of a service instance that was created via a recipe. E2E test recipes 316 not only test that the configuration is correct and current, it can also test true end to end behavior which can be affected by operational conditions such as physical link status on various router-to-router links, etc. For example, instead of the usual CRUD lifecycle management of service instances, the systems and methods described herein can be used to model the invocation of and collect and interpret the results of an active test that may be used for service verification. For example, a test UE, owned by a carrier, can be deployed to connect to an MVNO and then obtain a file from a carrier-owned server. It can be triggered to conduct the test and queried as to the results of this test. No actual service instance is created in this example, and is instead a stateless action. As described in more detail herein, service recipes 318 can be designed by SMEs for use by operators 106 to instantiate services.

Recipes can be designed to communicate with applications that are managed via SOAP/WL and publish a corresponding Web Service Definition Language (WSDL) 322, Yet Another Next Generation (YANG) 326, and/or Management Information Base (MIBS) 328. WSDL 322 is an XML format that defines services as collections of network endpoints capable of exchanging messages. YANG 326 is a language for NETCONF that is modular and represents data structures in an XML tree format. MIBS 328 allows a network management system to monitor database objects.

As described above, recipe transactor 112 can receive a recipe that can utilize any number of protocols (e.g., representation state transfer (REST) protocol 234, structured query language (SQL) protocol 236, simple object access protocol (SOAP) 238, secure files transfer protocol/secure shell protocol (SFTP/SSH) 240, simple network management protocol (SNMP) 242, network and configuration protocol (NETCONF) 244). Each protocol can be associated with and used to specify a configuration of a P/VNF 330 332 340 342, NFVO/NF/Application 334, P/VNF/Application 336, and remote database 344. For example, NETCONF can be used with YANG enabled routers (e.g., Juniper routers, Cisco routers). As described in more detail below, YANG files are published by an application provider (e.g., an "enterprise" YANG model) and/or standardized (e.g., released by Internet Engineering Task Force (IETF) in a Request For Comments (RFC)), and that can be dragged into a recipe builder 110 workspace to specify a workflow (e.g., QoS flow). Other protocols include REST, SOAP, and command line interface (CLI). NETCONF protocol is generally paired with YANG schema, SNMP protocol is generally paired with MIB schema, SOAP/XML protocol is generally paired with WSDL schema, and REST and CLI protocols generally have no formal schema.

Figure 4:
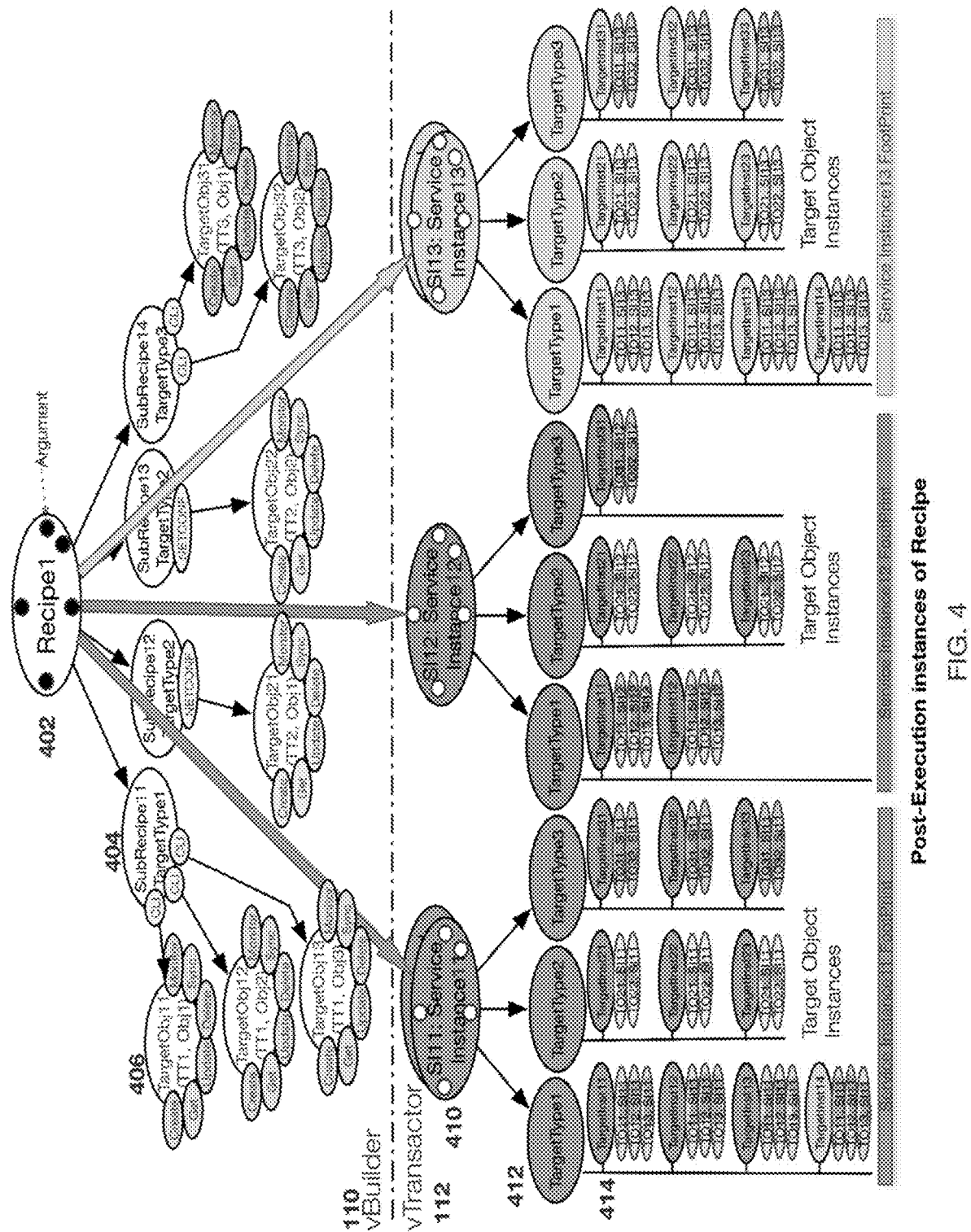
FIG. 4 is an object relationship diagram of service instances management, according to some embodiments of the present disclosure.

FIG. 4 is an object relationship diagram of service instances management, according to some embodiments of the present disclosure. FIG. 4 shows a recipe 402, subrecipe 404, and target schema object class 406 associated with a recipe builder 110; and a service instance 410, target type 412, and target instance 414 associated with a recipe transactor 112.

As shown in FIG. 4, the elements above the line show some embodiments of the systems and methods described herein from a recipe builder's 110 perspective (e.g., a service model); the elements below the line show some embodiments of the systems and methods described herein from the recipe transactor's 112 perspective (e.g., the results of executing the model to create service instances). In particular, the artifacts that have been configured into the network in terms of which target instances are involved (e.g., which PE router instances and what native objects or resources, including all their associated values), have been created on those target instances (i.e., VRFs, MP-BGP peering sessions, etc.). From recipe builder's 110 perspective, recipes 402, subrecipes 404, and target schema object classes 406 are created and linked to be deployed on recipe transactor 112. The first time a create command is issued (e.g., with an MVNO) associated with the recipe 402, a service instance 410 is created. The multiple service instances 410 represent each service instance that was created based on the service model as represented by recipe 1 402. The same recipe 402 can be used to provision different service instances for different customers. A service instance can be created by executing a recipe (e.g., a create command). In some embodiments, recipe transactor 110 has a MySQL database to keep track of the hierarchies of the service instances, and the target objects 414 (also referred to as the footprints of the service instance).

A recipe 402 can include multiple subrecipes 404. In some embodiments, each subrecipe 404 is associated with one or more target types 412. In some embodiments, target type 412 comprises a device type (e.g., router). A subrecipe 404 can include multiple target schema object classes 406 as constrained by a same target type and same connector type. Target schema object class 406 includes an object (e.g., VNF, PNF, application) that has to be configured in order to create a service instantiation. For example, target schema object classes 406 include CRUD semantics (e.g., create, retrieve, update, and delete).

As described above and referring to FIG. 1, a recipe can be created by a SME 108 to minimize the amount of manual configuration performed by an operator 106 to instantiate a service. In some embodiments, a recipe can be hard coded by a SME 108 eliminating the need for significant configuration by the operator 106. In some embodiments a recipe can have open fields to take inputs from the operator 106. For example, a recipe may leave open fields specifying for each VRF, a unique route discriminator integer value. The recipe can expose this value as a required argument for the operator 106 to provide. In some embodiments, a recipe can contain an open field comprising a logic input (e.g., if/else) such that the field is filled based on device configuration.

One implementation of a service instance 410 includes one or more target types 412 as specified by a subrecipe 404 associated with the recipe 402 from which the service instance 410 is defined. In some embodiments, a target type 412 includes one or more target instances 414. Target instance 414 is an instance of a virtual network function (VNF), physical network function (PNF) or application that actually exists (e.g., a Juniper router a Cisco router) and that a target instance 414 can talk to. Each target instance 414 is associated with a database of service instances and associated footprints and artifacts, as described above. In some embodiments, at run time, recipe transactor 112 can ask operator 106 to specify a number of instances. In some embodiments, all the parameters for each of the many service instances can be specified in a format (e.g., spreadsheet) that the transactor can consume.

Figure 5:
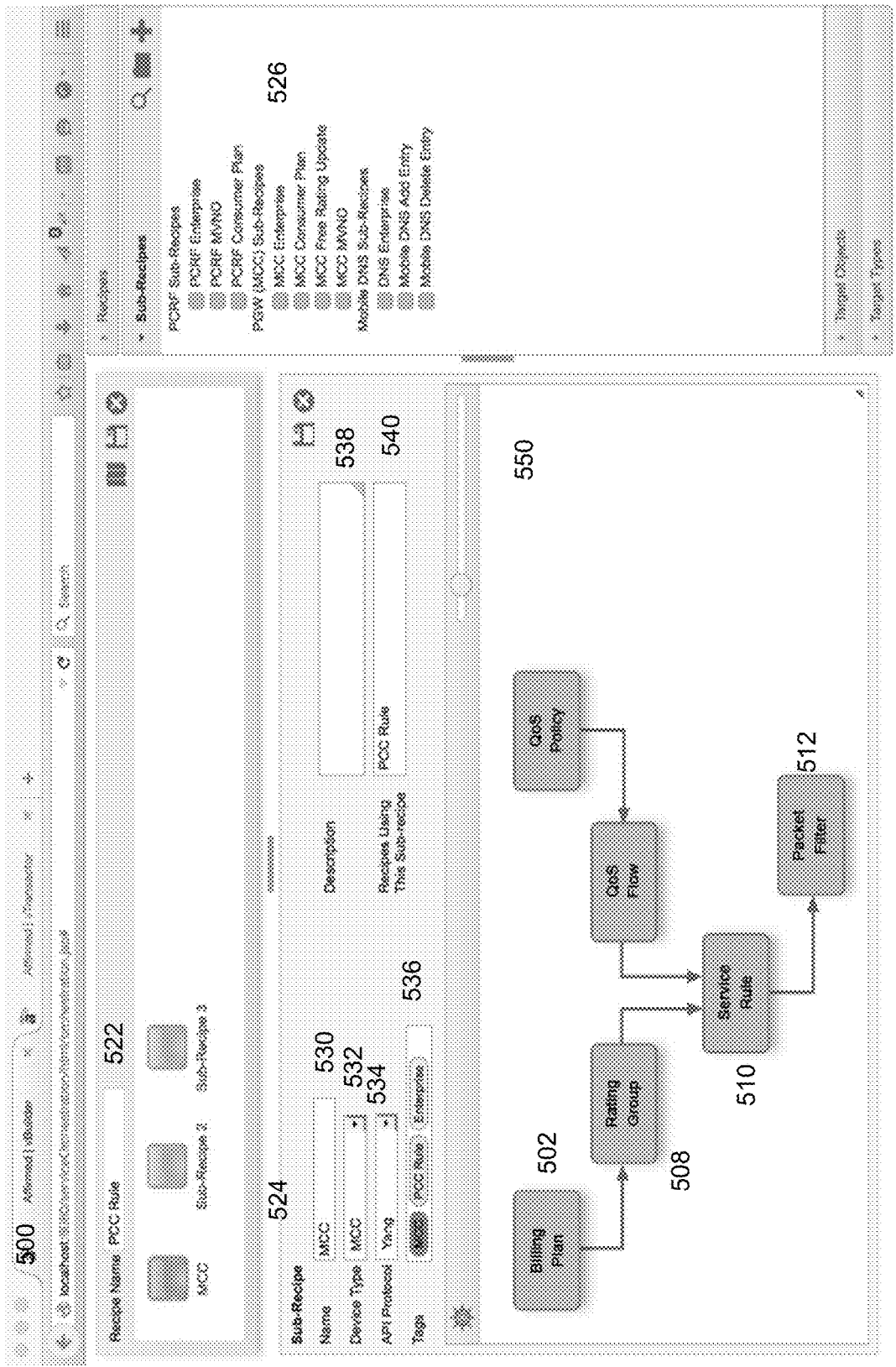
FIG. 5 is a screenshot showing a recipe builder user interface including a service recipe section and a subrecipe section, according to some embodiments of the present disclosure.

FIG. 5 is a screenshot showing a recipe builder user interface including a service recipe section and a subrecipe section, according to some embodiments of the present disclosure. FIG. 5 shows a recipe builder user interface 500, billing plan 502, rating group 508, service rule 510, packet filter 512, recipe section 522, subrecipe section 524, and subrecipe listing section 526.

Recipe builder user interface 500 includes a recipe section 522, subrecipe section 524 and subrecipe listing section 526. Recipe section 522 includes a field for receiving or setting a recipe name. Recipe section 522 also includes subrecipes associated with the recipe. As described above, each of the subrecipes can include at least one of target schema objects and decorated target object classes.

Subrecipe section 524 includes a field for receiving or setting a subrecipe name 530, a device type field 532, API protocol field 534, tags 536, description field 538, and recipes using the subrecipe field 540. For example, as shown in FIG. 5, a subrecipe name 530 can be mobile content cloud (MCC), the device type can be a mobile content cloud device 532, and the API protocol can be YANG protocol 534. Tags 536 includes key words associated with the MCC sub recipe. Recipes using this subrecipe field 540 includes policy and charging control (PCC) Rule, which is the recipe specified in the recipe name field. In some embodiments, a subrecipe can be associated with more than one recipe. In some embodiments, the recipes using this subrecipe field 540 can include multiple recipe names. Subrecipe 524 also includes a window 550 including a specification of relationships between objects (e.g., parent/child or hierarchical relationships between objects). A SME 108 can pick the objects and how the objects are interconnected. For example, rating group 508 can be a child of billing plan 502. Billing plan 502 can have one or more associations with rating groups 508. Rating group 508 can be associated with service rule 510, which can be further associated with packet filter 512. In some embodiments, hovering over an arrow connecting one object to another can show the relationship between the two objects. In some embodiments, a recipe specifies which target schema object classes are coalesced or joined together. For example, target schema object classes can be coalesced based on the existence of a parent child relationship. Decorated target object classes and coalescing target schema object classes can result in further data hiding.

Subrecipe listing section 526 lists subrecipes created by or available to a SME 108 using recipe builder 110. Subrecipes can be grouped by mobile network element type or structure (e.g., PCRF, PGW, Mobile DNS). As described above, some embodiments of the system described have no a priori knowledge of target types, but the systems can have a priori knowledge of connector types. As described above, the SME 108 creates target types in the recipe builder. When YANG, WSDL, or other schemas are available to the SME, the SME imports said schemas and associates them to the target types. A schema type implies a connector type (e.g., WSDL implies SOAP/XML).

Figure 6A:
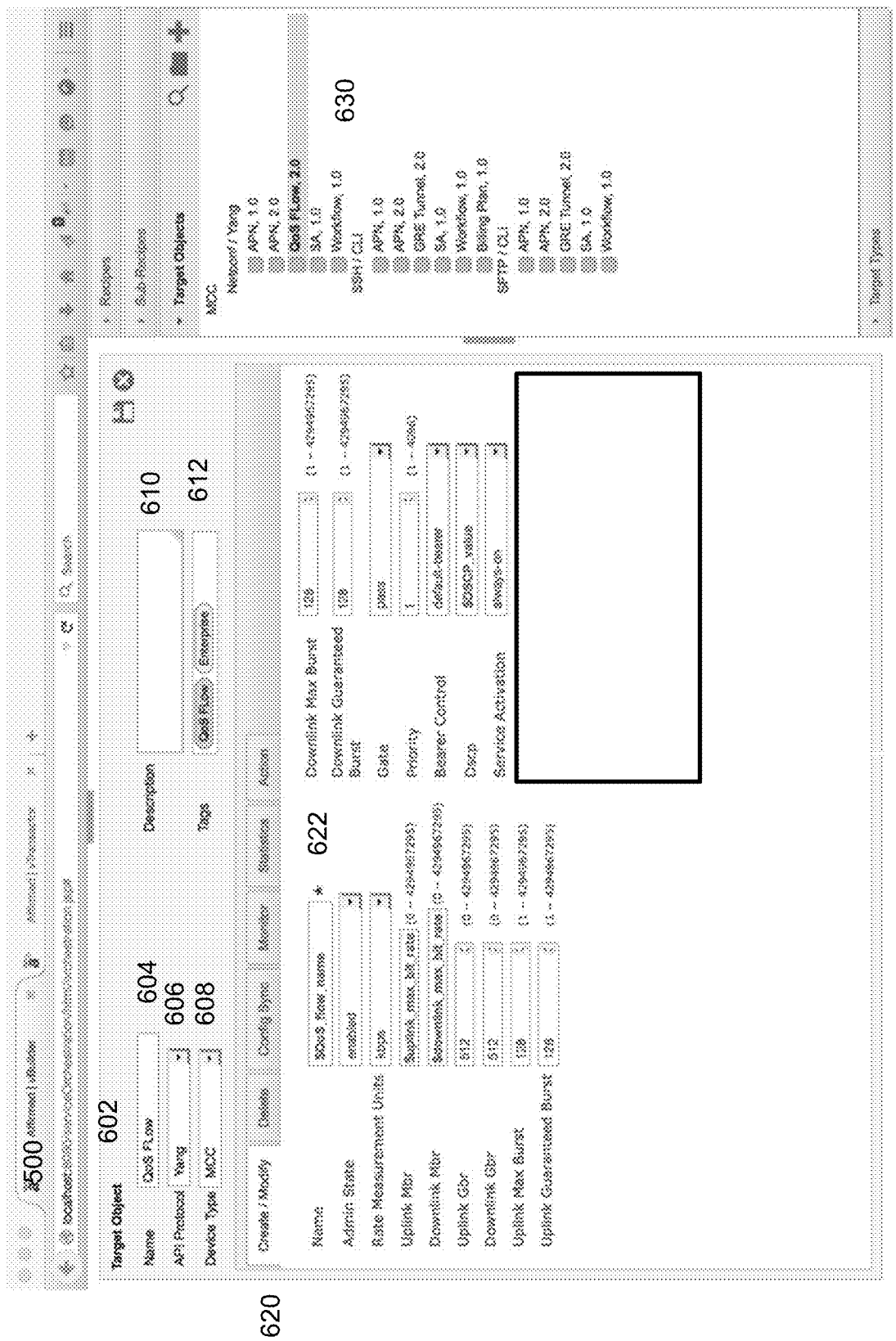
FIGS. 6A-6B are screenshots showing a recipe builder user interface including native target object representations, according to some embodiments of the present disclosure.
Figure 6B:
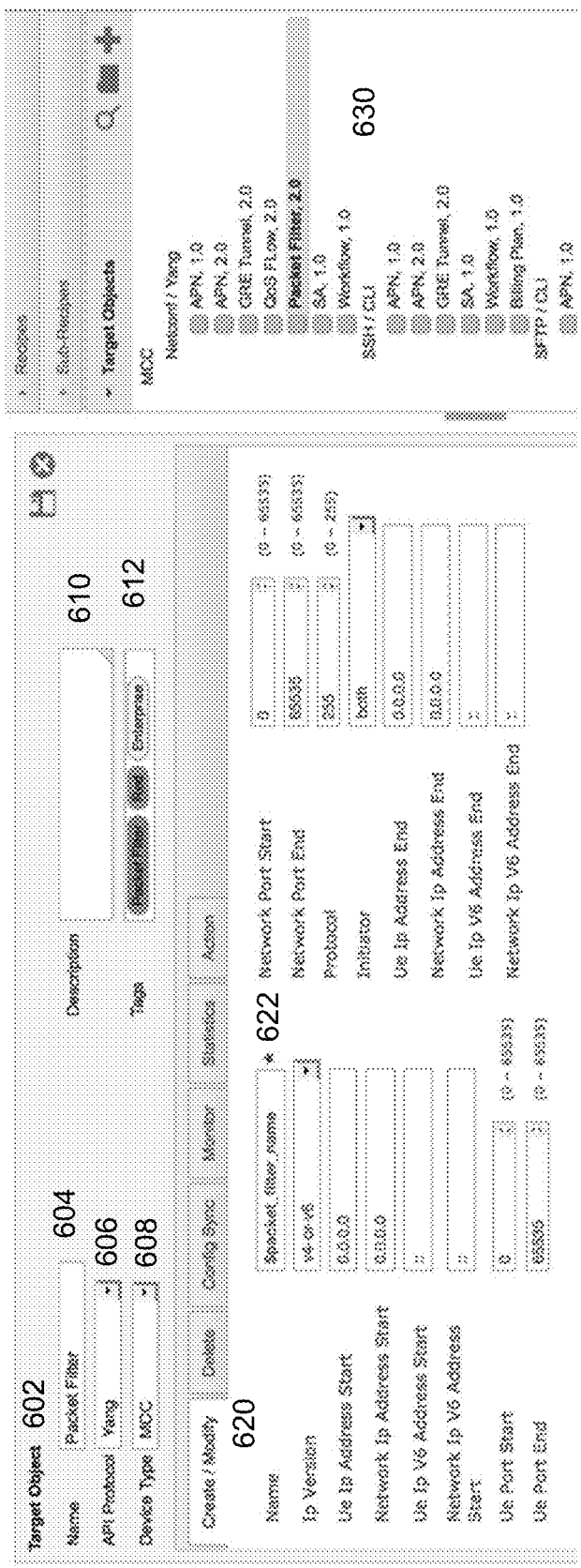

FIGS. 6A-6B are screenshots showing native target schema object class representations (e.g., as extracted from a published configuration object schema such as YANG or as created dynamically by the user of the system), according to some embodiments of the present disclosure. Together, FIGS. 6A-6B show a target object section 602, an activity tab 620, fields within the activity tab 622, and a target objects listing section 630.

Target object section 602 is contained within recipe builder user interface 500. Target object section 602 includes several parameters, including a field for a target schema object class name 604, target schema object class API protocol 606, target schema object class device type 608, target schema object class description 610, and/or target schema object class tag 612. In FIG. 6A, target schema object class name is quality of service (QoS) flow. QoS flow is an MCC device using API protocol YANG. In FIG. 6B, target schema object class name is Packet Filter. Packet Filter is an MCC object type using API protocol YANG. In some embodiments, at least one of the fields is configurable.

Target object section 602 also includes facet tabs 620. Facet tabs 620 can include a create/modify tab, delete tab, config sync tab, monitor tab, statistics tab, and action tab. Create/modify tab allows a SME 108 to create or modify a target schema object class. Delete tab allows SME 108 to delete an instance. Monitor tab allows a SME 108 to determine the status of instances. Config Sync tab relates to persistent data of an instance. Statistics tab shows the statistics-related attributes of the target's native object (e.g., packets, bytes, etc.). On the statistics tab, the SME can indicate which, if any, of the available fields are of interest (e.g., which can be collected for any service instances that are built based on recipes that utilize this target schema object class). Action tab refers to a non-CRUD facet or a facet that has no effect on the persistent data store (e.g., reboot, fetching a file during a virus scan).

For example, as shown in FIG. 6A, a QoS flow target schema object class is being modified. In some embodiments, objects that are already created are listed in the target objects listing section 630. A SME can specify which fields 622 in the activity tab are hard coded and which fields 622 need to be specified through recipe transactor. In some embodiments, fields that should be specified through recipe transactor are marked with an indicator (e.g., marked with a red asterisk).

Target objects listing section 630 lists target schema object classes created by or available to a SME 108 using recipe builder 110. Target schema object classes can be arranged by target type (e.g., MCC), first, then connector type within the target type (e.g., NetConf/Yang, SSH/CLI, SFTP/CLI).

Figure 6C:
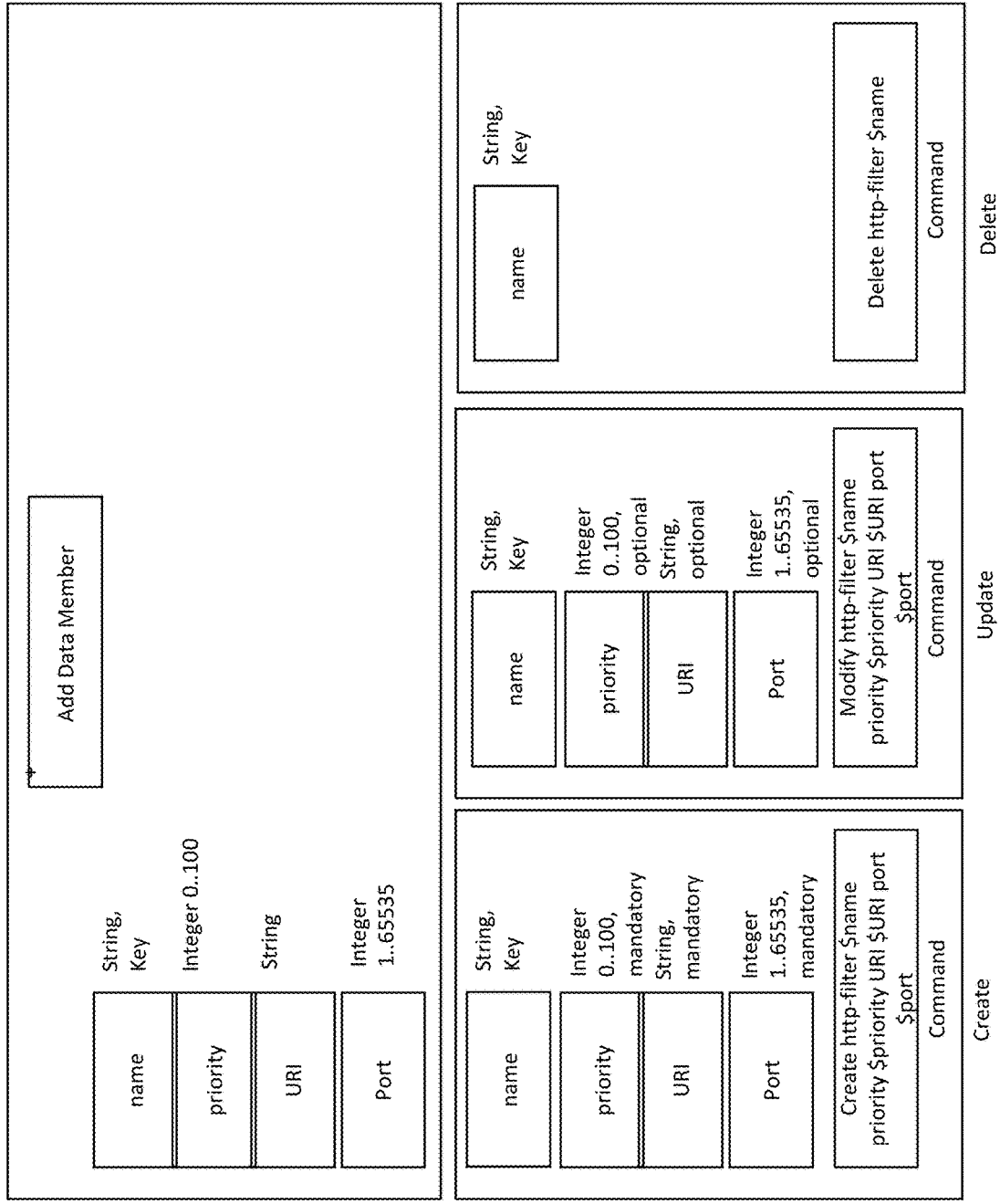
FIG. 6C is a diagram of a recipe builder user interface used to design a target schema object for a connector type, according to some embodiments of the present disclosure.

FIG. 6C is a representation of a recipe builder user interface used to design a target schema object, according to some embodiments of the present disclosure. The target schema object can be used for a connector type, such as CLI, that has no native schema associated to it (e.g., contrasted to the availability of YANG schemas associated to the NET- CONF connector). In this interface, the SME can design an object representation by declaring the existence of parameters (variables) and mapping them to the specific commands (e.g., CLI textual strings) required for life-cycle management of the object (i.e., create, retrieve, update, delete).

Figure 6D:
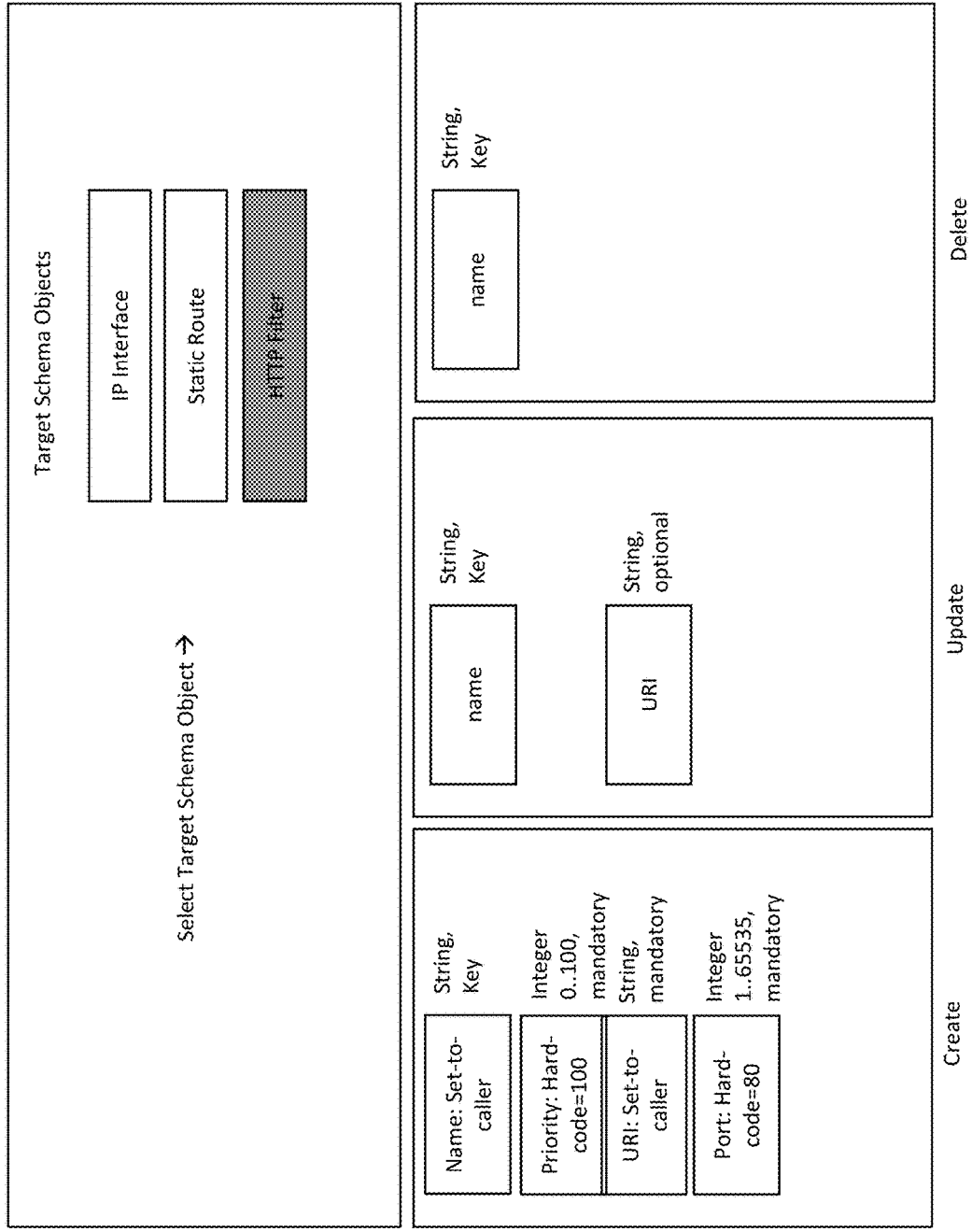
FIG. 6D is a diagram of a recipe builder user interface used to design a decorated target object class, according to some embodiments of the present disclosure.

FIG. 6D is a representation of a recipe builder user interface used to design a decorated target object class, according to some embodiments of the present disclosure. In some embodiments, the decorated target object class is designed by first selecting a target schema object. The approach allows for specialization of multiple decorated target object classes based on the same "base" target schema object. The available decorations include the ability to hard-code parameters to specific values, force optional parameters to be mandatory, and constrain numerical ranges for parameters to be more restrictive than would be allowed by the "base" target schema object.

Figure 7:
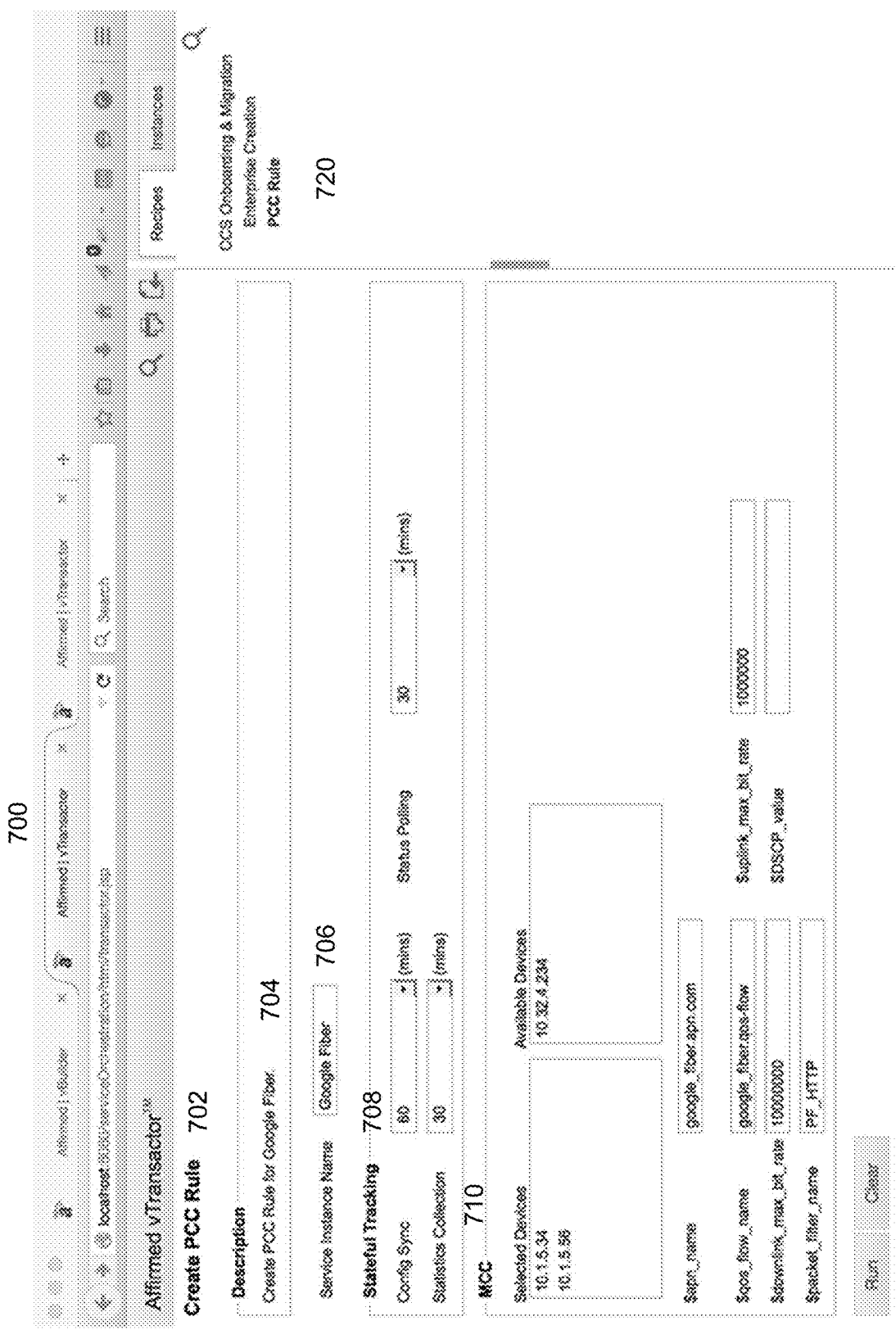
FIG. 7 is a screenshot showing a recipe transactor user interface, according to some embodiments of the present disclosure.

FIG. 7 is a screenshot showing a recipe transactor page, according to some embodiments of the present disclosure. FIG. 7 shows a recipe transactor page 700, a recipe title 702, a description of the recipe 704, a service instance name 706, stateful tracking 708, MCC 710, and a listing of recipes and instances 720.

From recipe transactor page 700, an operator can execute or run a recipe. The recipe execution page includes a recipe title which describes the recipe (e.g., creating a policy and charging control (PCC) rule). The description of the recipe 704 relates the recipe to a service instance. A service instance name can also be specified in the service instance name field 706. recipe transactor page 700 also includes stateful tracking 708. An operator can specify an interval at which config sync is run, or at which statistics are collected. Recipe transactor page 700 can also include, in some embodiments, MCC 710, which lists selected devices, available devices, and other mobile content cloud parameters, such as APN name, QoS flow name, maximum uplink and downlink rates, and packet filter name. As described above, many of the fields on the transactor page 700 are specified as part of a recipe designed by a SME 108. The listing of recipes and instances 720 shows recipes ready for execution or executed by an operator and instances created by an operator.

Figure 8:
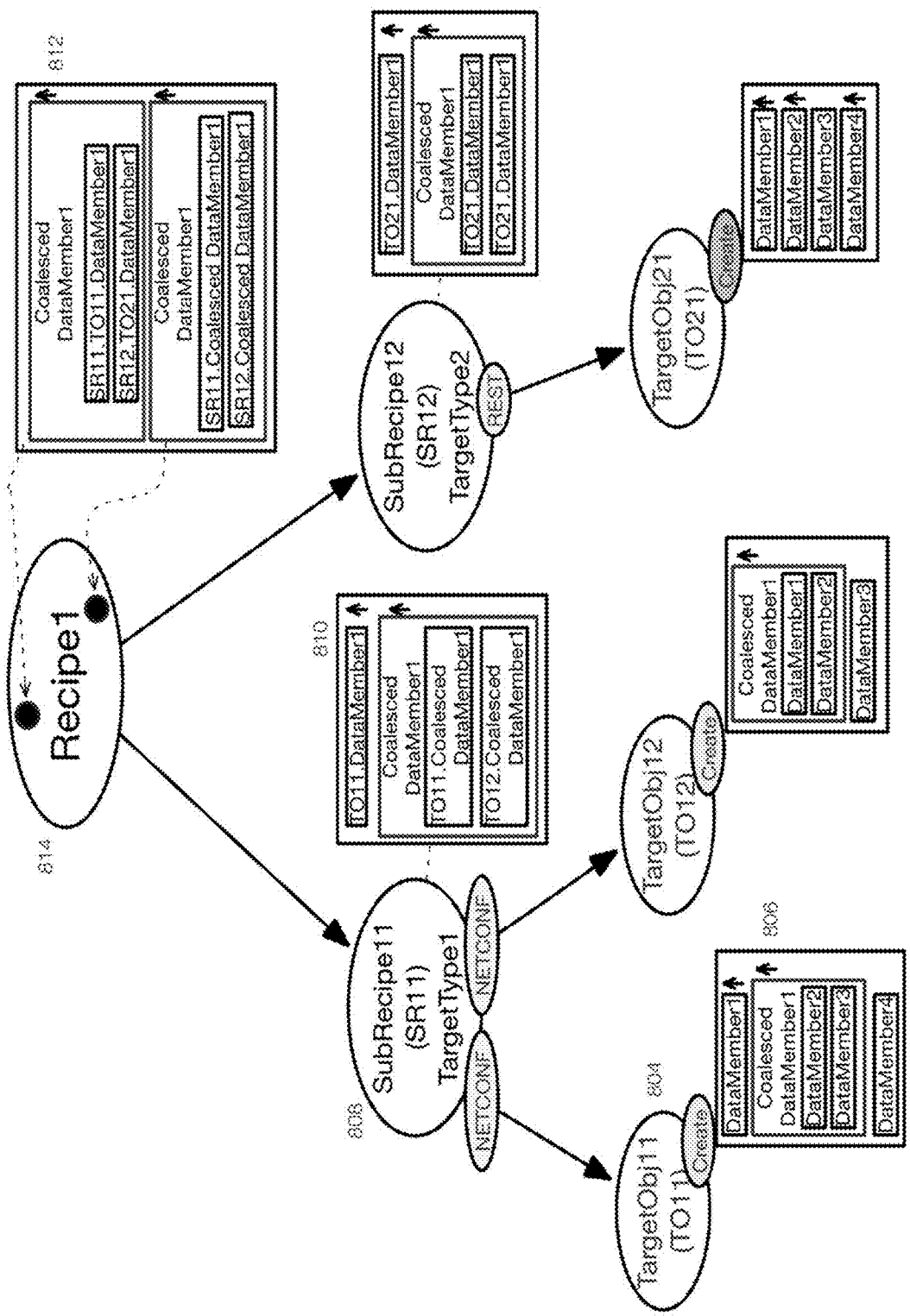
FIG. 8 is a diagram showing parameter coalescing in recipe builder, according to some embodiments of the present disclosure.

FIG. 8 is a diagram showing parameter coalescing in recipe builder, according to some embodiments of the present disclosure. FIG. 8 shows parameter coalescing 802, decorated target object class 804, parameter coalescing at decorating target object 806, sub-recipe 808, parameter coalescing at sub-recipe 810, recipe 814, and parameter coalescing at recipe 812. FIG. 8 also shows how the SME decorates the parameters in different target schema object classes across the devices to bubble up few parameters at recipe level that are needed to input the values.

Parameter coalescing 802 is a mechanism to group similar parameters and accept one value from the origin or the service operator. For example, a service-rule can be configured across PGW and PCRF devices, and service-rule-names can be maintained such that they are the same in both device types. If the service name is manually entered twice for each device type, any typo that occurs in the lengthy name can result in a configuration mismatch between the two device types. With a parameter coalescing mechanism, similar parameters across the devices can have the same values and the service operator would be allowed to enter only one value for all devices. Additionally, parameter coalescing 802 helps in reducing the number of parameters needed at a recipe level. As shown in FIG. 8, even though the number of parameters are bubbled up from decorated target object classes 804, and sub-recipes 808, only two parameters are decorated and exposed at the recipe level. It means service operator in recipe transactor 116 is expected to provide values for only two parameters, in this example, in order to create a service instance using this recipe.

Parameter coalescing 802 works at all levels, at decorated target object class 804 level, sub-recipe 808 level or recipe 814 level. At each level, a similar parameter can be coalesced. At decorated target object class 804, DataMember1 and DataMember2 are grouped together as a coalesced datamember1 (CDM) at TargetObj11 as shown in 806. Similarly coalescing is done at TargetObj2, but no coalescing is done at TargetObj21. When the parameters are bubbled up at sub-recipe 808, coalescing is done at sub-recipe level. As shown in 810, coalescing is done with a CDM (coalesced data member) that came from TargetObj11 and another CDM that came from TargetObj12. CDM is like any other parameter or data member. It will take the attributes that are applicable to all parameters in the set. For example, if one member of CDM is of type int32 and another member is of type int64, CDM will take the type as int32 in order to be applicable to all parameters in the set. When the parameters are bubbled up to recipe 814, similar parameters can be coalesced at recipe level, as shown in 812.

Figure 9:
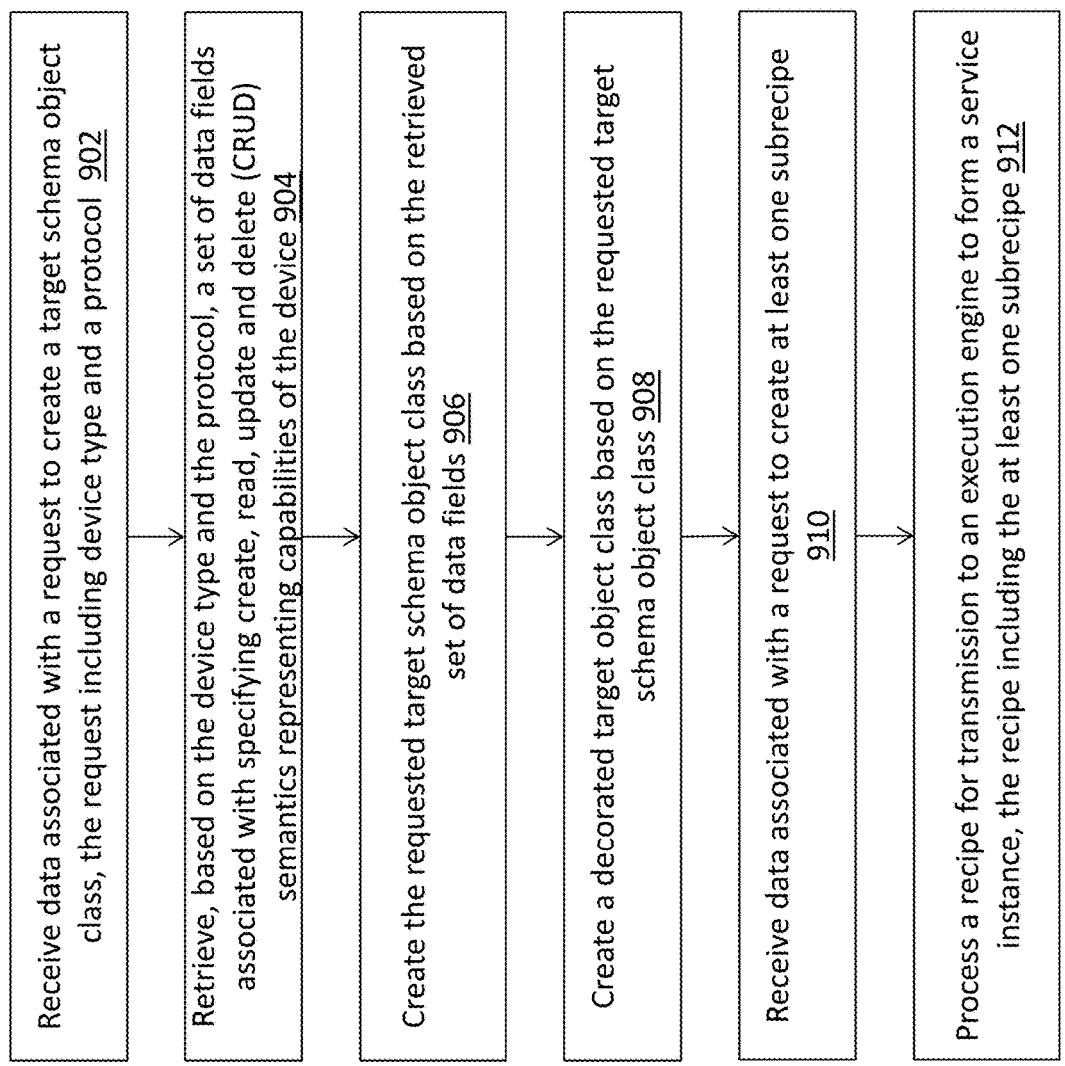
FIG. 9 is a flowchart showing the creation of a recipe being used to automate portions of creating a service instance, according to some embodiments of the present disclosure.

FIG. 9 is a flowchart showing the creation of a recipe being used to automate portions of creating a service instance, according to some embodiments of the present disclosure.

Referring to step 902, the recipe builder receives data associated with a request to create a target schema object class. In some embodiments, the target schema object is associated with a connected device type category. The connected device type category can indicate a managed device and associated protocol in that exists (or could exist) in a mobile network. The connected device type category can be received and created prior to receiving a request to create a target schema object class.

In some embodiments, the request to create a target schema object class also includes a first object parameter associated with the target schema object class. In some embodiments, the first object parameter includes at least one of the device type associated with the managed device and the protocol. The target schema object class can represent a class of configurable resources based on the device type and the protocol. In some embodiments, the target schema object class is associated with at least one of quality of service, rating group, billing plan and packet filter. In some embodiments, the protocol can include at least one of representation state transfer (REST) protocol, structured query language (SQL) protocol, simple object access protocol (SOAP), secure files transfer protocol/secure shell protocol (SFTP/SSH), simple network management protocol (SNMP), and network and configuration protocol (NETCONF). A device type can include a mobile content cloud device, a PCRF, a router, or a PGW.

Referring to step 904, the recipe builder retrieves, based on the device type and the protocol, a set of data fields associated with specifying create, read, update and delete (CRUD) semantics representing capabilities of the device. In some embodiments, the set of data fields is retrieved from a database associated with the recipe builder when configuration parameters associated with the protocol comprise an importable form, the importable form being associated with data that is importable from a server into the database, and user provided data when the configuration parameters associated with the protocol comprise a non-importable form, the non-importable form being associated with data that is not importable from a server into the database.

Referring to step 906, the recipe builder creates the requested target schema object class based on the retrieved set of data fields. As described above, the target schema object class made available to the SME can contain all possible fields that can be configured based on the device type and the protocol.

Referring to step 908, the recipe builder creates a decorated target object class based on the requested target schema object class. In some embodiments, the decorated target object class including specified values for at least a portion of the data fields in the retrieved set of data fields. In some embodiments, the decorated target object class includes a subset of data fields that are pre-filled based on the protocol information. In some embodiments, the data fields are filled entirely by a user of the recipe builder. In some embodiments, the data fields are filled by a combination of protocol information and a user of the recipe builder.

Referring to step 910, the recipe builder receives data associated with a request to create at least one subrecipe. In some embodiments, each of the at least one subrecipes include at least one of 1) the decorated target object class; and 2) one or more other decorated target object classes, and data indicating an association between the decorated target object class and the one or more other decorated target object classes. As described above, a hierarchy can be established between the decorated target object class to indicate relationships and flows between the decorated target object classes.

Referring to step 912, the recipe builder processes a recipe for transmission to an execution engine to form a service instance, where the recipe includes the at least one subrecipe. In some embodiments, the service instance comprising service instance data fields that are prefilled or hidden based on the specified values, the service instance being customizable by an operator for a specific network device such that the service instance data fields that are not prefilled can be customized by the operator.

An example of the systems and methods described herein can involve a SME, who can be an employee or consultant of a public network operator, creating a service template used to onboard and manage L3 corporate VPN connectivity services. The SME, having first acquired a working knowledge of the business objectives for the service and the detailed operation of the network devices used by the network operator to provide the service, would commence construction of the service template in the recipe builder. For this example, assume that the L3 VPN requires detailed incremental configuration of both routers and firewalls. Additionally, the network operator employs routers from 2 different vendors, vendor R1 and vendor R2, and firewalls from 2 different vendors, vendor F1 and F2. Any particular L3 VPN instance (i.e., provided for a particular corporate customer), may be deployed on only instances of R1, only instances of R2, or a combination of some instances of R1 and R2. And, likewise combinations of firewalls following the same pattern. The service template constructed by the SME using the recipe builder can deal with all possible combinations. In the example, the SME follows the following steps:

1. Define the connected device types in use by specifying the pairing of a device type and a protocol. For example:
   a. R1 connected via NETCONF
   b. R2 connected via CLI
   c. F1 connected via REST
   d. F2 connected via SOAP
2. Create the Target Schema Object Classes:
   a. For NETCONF and SOAP based connected devices, import the full machine readable schema (YANG for R1 via NETCONF; WSDL for F2 via SOAP). This step causes recipe builder to dynamically create all supported target schema object classes (i.e., that correspond to each manageable resource described in the machine readable schema).
   b. For CLI and REST based connected devices, the SME manually creates each required target schema object class that will be needed during the subsequent steps.
   c. Examples in step 2 include resources such as:
      i. IP interface on R2, F1
      ii. IP interface on R2, F1V
      iii. RF on R2, F1
      iv. VRF on R2, F1
      v. BGP neighbor on R2
      vi. Access Control List on F1
      vii. Trust Zone on F1
3. For each of the target schema object classes of interest from steps 2a and 2b, create decorated target object classes, which, in some embodiments, are constrained and/or annotated variations of the resources. Here, the SME is simplifying the full complexity and capabilities of the resource in a way that will be consumable by the operator that will eventually be tasked with the actual onboarding and management in the operational network.
4. Group the decorated target object classes together into subrecipes based on connected device type and logical associations between them. Examples include:
   a. Routed Interface on R1 comprising IP Interface decorated target object for R1 and BGP neighbor decorated target object for R1
   b. Routed interface on R2 comprising IP Interface decorated target object for R2 and BGP neighbor decorated target object for R2
   c. Trusted interface on F1 comprising Trust Zone decorated target object for F1 and IP interface decorated target object for F1
   d. Trusted interface on F2 comprising Trust Zone decorated target object for F2 and IP interface decorated target object for F2
5. Group the subrecipes together to form multi-vendor recipes. Examples:
   a. Routed Interface comprising Routed Interface subrecipe for R1 and Routed Interface subrecipe for R2
   b. Trusted Interface comprising Trusted Interface subrecipe for F1 and Trusted Interface subrecipe for F2
6. Optionally, coalesce parameters at all levels to avoid duplicate parameter entry by the operator when values should be forced to be the same. For example, the name of a created IP interface should be the same, regardless of whether the R1 or R2 type of router is used for the service instance—coalescing would be used to aggregate the IP interface name required by the IP interface subrecipe for R1 and the same as required by the IP interface subrecipe for R2.
7. Export the completed service template from the recipe builder.
8. Import the completed service template on the recipe transactor.
9. Operator now gets to use the service template to create, retrieve, update, delete, and verify instance of the L3 VPN service.

While certain embodiments of the present disclosure have described data automation techniques with respect to telecommunication applications, the systems and methods described herein are also applicable to other applications that use agent-less targets. As described above, agent-less targets are usually targets that need to be constantly configured. Unlike agent-based targets where update information can be pulled from a server, the updates associated with an agent-less target require either more frequent and/or more application specific updates that are not practicable to pull from a server. An example of an agent-less application is factory automation. Robotic parts in a factory may require incremental configuration (e.g., robotic parts in an assembly line).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of building service templates that allow for an agentless, data-driven and stateful automation of a provisioning of services to mobile network customers, the computerized method comprising:

receiving, at a computing device, data associated with a request to create a connected device type category, the connected device type category associated with a device and associated protocol in a mobile network;

receiving, at the computing device, data associated with a request to create a target schema object class associated with the connected device type category, the request including a first object parameter associated with the target schema object class, the first object parameter including at least one of a device type of the device and the protocol, the target schema object class representing a class of configurable resources based on the device type and the protocol;

retrieving, at the computing device, based on the first object parameter, a set of data fields associated with specifying create, read, update and delete (CRUD) semantics representing capabilities of the device from:
   a database associated with the computing device, when configuration parameters associated with the protocol comprise an importable form, the importable form being associated with data that is importable from a server into the database, and
   user provided data when the configuration parameters associated with the protocol comprise a non-importable form, the non-importable form being associated with data that is not importable from a server into the database;

creating, by the computing device, the requested target schema object class, the requested target schema object class including the retrieved set of data fields;

creating, by the computing device, a decorated target object class based on the requested target schema object class, the decorated target object class including specified values for at least a portion of the data fields in the retrieved set of data fields;

receiving, at the computing device, data associated with a request to create at least one subrecipe, each of the at least one subrecipes comprising at least one of:
   the decorated target object class, one or more other decorated target object classes, and
   data indicating an association between the decorated target object class and the one or more other decorated target object classes; and processing, at the computing device, a recipe for transmission to an execution engine to form a service instance, the recipe including the at least one subrecipe, the service instance comprising service instance data fields that are prefilled or hidden based on the specified values, the service instance being customizable by an operator for a specific network device such that the service instance data fields that are not pre-filled can be customized by the operator.

2. The computerized method of claim 1, further comprising:
determining, by the computing device, a set of subrecipes in the at least one subrecipe having a common decorated target object class, wherein the common decorated target object class is present in each of the set of subrecipes;
receiving, by the computing device, a coalesced parameter for one common decorated target object class in one subrecipe in the set of subrecipes, wherein the coalesced parameter includes a set of values for data fields of the one common decorated target object class;
applying, by the computing device, the coalesced parameter to each of the other common decorated target object classes associated with each of the other at least one subrecipes.

3. The computerized method of claim 1, wherein creating, by the computing device, a decorated target object class further comprises receiving, by the computing device, the specified values.

4. The computerized method of claim 1, wherein the specified values are derived from the first object parameter.

5. The computerized method of claim 1, wherein the service instance further includes a target instance, the target instance including at least one of a virtual network function, physical network function or an application.

6. The computerized method of claim 1, wherein the configurable resources include at least one of quality of service, rating group, billing plan and packet filter.

7. The computerized method of claim 1, wherein the protocol comprises at least one of representation state transfer (REST) protocol, structured query language (SQL) protocol, simple object access protocol (SOAP), secure files transfer protocol/secure shell protocol (SFTP/SSH), simple network management protocol (SNMP), and network and configuration protocol (NETCONF).

8. A computing device for building service templates that allow for an agentless, data-driven and stateful automation of a provisioning of services to mobile network customers, the computing device comprising:
a memory; and
a processor in communication with the memory, and configured to run a module stored in memory that is configured to cause the processor to:
   receive data associated with a request to create a connected device type category, the connected device type category associated with a device and associated protocol in a mobile network;
   receive data associated with a request to create a target schema object class associated with the connected device type category, the request including a first object parameter associated with the target schema object class, the first object parameter including at least one of a device type of the device and the protocol, the target schema object class representing a class of configurable resources based on the device type and the protocol;
   retrieve based on the first object parameter, a set of data fields associated with specifying create, read, update and delete (CRUD) semantics representing capabilities of the device from:
      a database associated with the computing device, when configuration parameters associated with the protocol comprise an importable form, the importable form being associated with data that is importable from a server into the database, and
      user provided data when the configuration parameters associated with the protocol comprise a non-importable form, the non-importable form being associated with data that is not importable from a server into the database;
   create the requested target schema object class, the requested target schema object class including the retrieved set of data fields;
   create a decorated target object class based on the requested target schema object class, the decorated target object class including specified values for at least a portion of the data fields in the retrieved set of data fields;
   receive data associated with a request to create at least one subrecipe, each of the at least one subrecipes comprising at least one of:
      the decorated target object class, and
      one or more other decorated target object classes, and
      data indicating an association between the decorated target object class and the one or more other decorated target object classes; and process a recipe for transmission to an execution engine to form a service instance, the recipe including the at least one subrecipe, the service instance comprising service instance data fields that are prefilled or hidden based on the specified values, the service instance being customizable by an operator for a specific network device such that the service instance data fields that are not pre-filled can be customized by the operator.

9. The computing device of claim 8, wherein the processor is further caused to:
determine a set of subrecipes in the at least one subrecipe having a common decorated target object class, wherein the common decorated target object class is present in each of the set of subrecipes;
receive a coalesced parameter for one common decorated target object class in one subrecipe in the set of subrecipes, wherein the coalesced parameter includes a set of values for data fields of the one common decorated target object class; and
apply the coalesced parameter to each of the other common decorated target object classes associated with each of the other at least one subrecipes.

10. The computing device of claim 8, wherein to create a decorated target object class, the processor is further caused to receive the specified values.

11. The computing device of claim 8, wherein the specified values are derived from the first object parameter.

12. The computing device of claim 8, wherein the service instance further includes a target instance, the target instance including at least one of a virtual network function, physical network function or an application.

13. The computing device of claim 8, wherein the configurable resources include at least one of quality of service, rating group, billing plan and packet filter.

14. The computing device of claim 8, wherein the protocol comprises at least one of representation state transfer (REST) protocol, structured query language (SQL) protocol, simple object access protocol (SOAP), secure files transfer protocol/secure shell protocol (SFTP/SSH), simple network management protocol (SNMP), and network and configuration protocol (NETCONF).

15. A non-transitory computer readable medium having executable instructions operable to cause an apparatus to:
receive data associated with a request to create a connected device type category, the connected device type category associated with a device and associated protocol in a mobile network;
receive data associated with a request to create a target schema object class associated with the connected device type category, the request including a first object parameter associated with the target schema object class, the first object parameter including at least one of a device type of the device and the protocol, the target schema object class representing a class of configurable resources based on the device type and the protocol;
retrieve based on the first object parameter, a set of data fields associated with specifying create, read, update and delete (CRUD) semantics representing capabilities of the device from:
a database associated with the computing device, when configuration parameters associated with the protocol comprise an importable form, the importable form being associated with data that is importable from a server into the database, and
user provided data when the configuration parameters associated with the protocol comprise a non-importable form, the non-importable form being associated with data that is not importable from a server into the database;
create the requested target schema object class, the requested target schema object class including the retrieved set of data fields;
create a decorated target object class based on the requested target schema object class, the decorated target object class including specified values for at least a portion of the data fields in the retrieved set of data fields;
receive data associated with a request to create at least one subrecipe, each of the at least one subrecipes comprising at least one of:
the decorated target object class, and
one or more other decorated target object classes, and data indicating an association between the decorated target object class and the one or more other decorated target object classes; and
process a recipe for transmission to an execution engine to form a service instance, the recipe including the at least one subrecipe, the service instance comprising service instance data fields that are prefilled or hidden based on the specified values, the service instance being customizable by an operator for a specific network device such that the service instance data fields that are not pre-filled can be customized by the operator.

16. The non-transitory computer readable medium of claim 15, wherein the apparatus is further caused to:
determine a set of subrecipes in the at least one subrecipe having a common decorated target object class, wherein the common decorated target object class is present in each of the set of subrecipes;
receive a coalesced parameter for one common decorated target object class in one subrecipe in the set of subrecipes, wherein the coalesced parameter includes a set of values for data fields of the one common decorated target object class; and
apply the coalesced parameter to each of the other common decorated target object classes associated with each of the other at least one subrecipes.

17. The non-transitory computer readable medium of claim 15, wherein to create a decorated target object class, the apparatus is further caused to receive the specified values.

18. The non-transitory computer readable medium of claim 15, wherein the specified values are derived from the first object parameter.

19. The non-transitory computer readable medium of claim 15, wherein the service instance further includes a target instance, the target instance including at least one of a virtual network function, physical network function or an application.

20. The non-transitory computer readable medium of claim 15, wherein the configurable resources include at least one of quality of service, rating group, billing plan and packet filter.

* * * * *